United States Patent Office 3,176,176
Patented Mar. 30, 1965

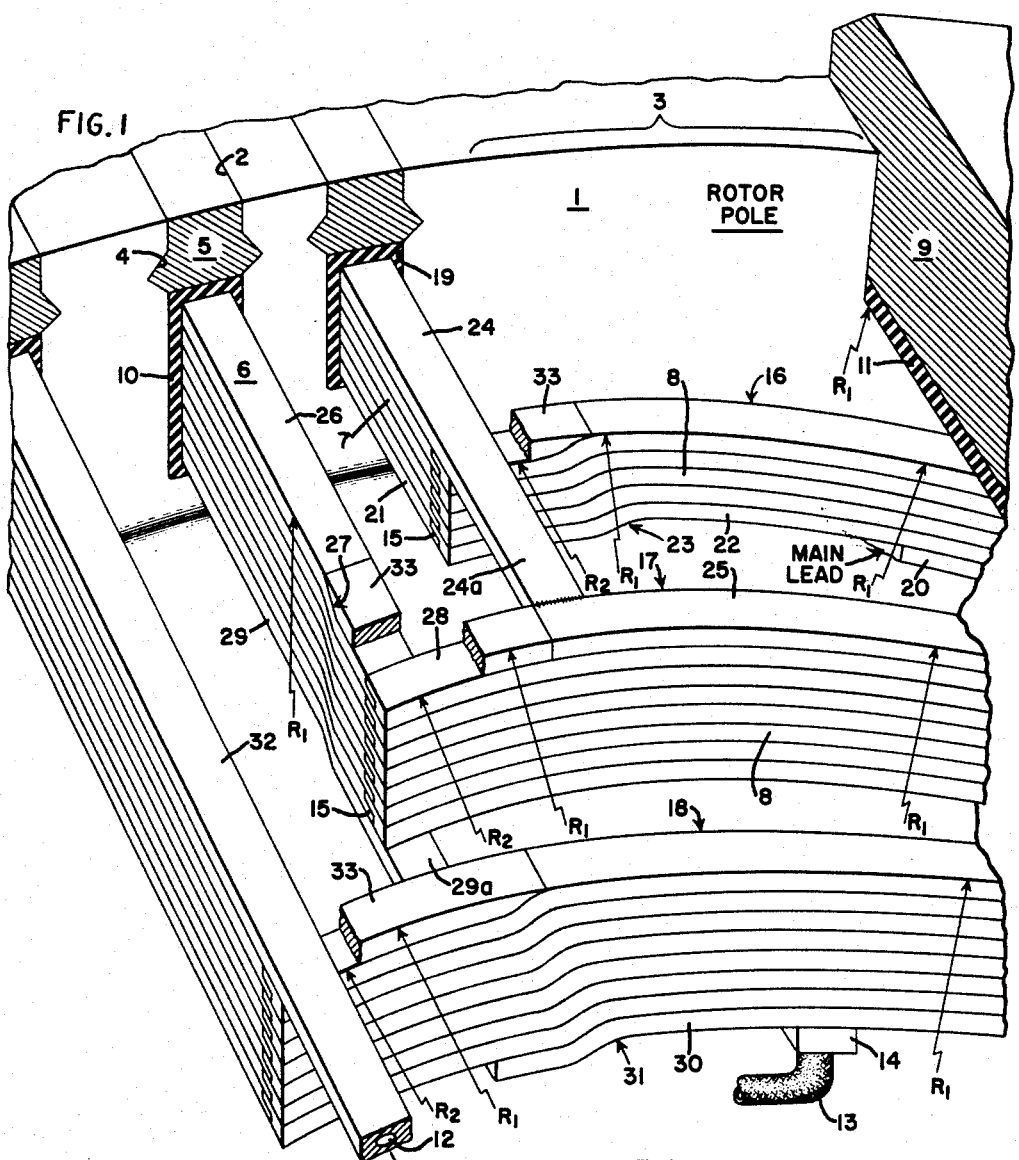
INVENTOR:
DAVID M. WILLYOUNG.
BY W. C. Crutcher
HIS ATTORNEY.

3,176,176
COIL-TO-COIL CONNECTIONS FOR DYNAMO-
ELECTRIC MACHINE ROTOR WINDING
David M. Willyoung, Scotia, N.Y., assignor to General
Electric Company, a corporation of New York
Filed Dec. 28, 1961, Ser. No. 162,739
3 Claims. (Cl. 310—208)

This invention relates to dynamoelectric machine rotor windings of the type where the windings are made up of turns stacked radially one over the other in longitudinal slots spaced around the rotor periphery, and more particularly it relates to an arrangement for connecting together the winding coils circumscribed about each rotor pole.

In a dynamoelectric machine rotor winding, such as the field winding for a large turbine generator, the separate conductors, whether they be in the form of a continuous strip or in the form of separate pieces to be brazed or otherwise connected during assembly, are wound in the form of longitudinal coils. Each coil is disposed in a pair of slots with circumferential end turn portions connecting the slot-lying portions. The coils are disposed symmetrically about the respective rotor poles and are circumscribed about one another, i.e., the inner coil lies in a pair of slots on either side of a pole, the next coil lies circumferentially and longitudinally "outward" of the inner coil, etc.

Since the top conductors in the slots are all of equal radial distance from the axis, and since the current must make a transition from one layer to the next for each turn of the coil, the circumferentially extending end turns on one end of the rotor must provide for this transition in radial height from one turn to the next. This has usually required the equivalent radial space of one extra conductor thickness extending over at least a major portion of the circumferentially extending sections of the coil end turns at one end of the rotor, the extra space being filled with electrically inactive material, such as insulating filler blocks or inactive conductor material in order to provide a smooth layer-to-layer transition for the conductors.

As generators have become larger, the space in the end turn region has become more congested. The maximum outer diameter is usually limited by the stresses imposed on the retaining ring holding the end turns in place, whereas the inner diameter is limited to a minimum value determined by rotor rigidity. With gas-cooled rotors, it is desirable to have as much space as possible under the circumferential portions of the end turns for admission and circulation of coolant. With liquid-cooled rotors, space must be provided for liquid pipes and manifolds. Also with liquid-cooled rotors, the radial thickness of a single conductor may be as much as one inch or more, in order to provide the internal wall thickness for containing the pressure of the liquid coolant at high centrifugal speeds. Hence, the loss of space occupied by one conductor thickness between the retaining ring and the shaft is of vital concern.

It has been known previously that the coils may be wound alternately from top to bottom and from bottom to top in the slots. In this manner, the last conductor of one coil is at the same radial height as the first conductor of the succeeding coil. Thus the coil-to-coil connections have usually been made by connecting straps at the pole centerline from the top of one coil to the top of the next outward coil, and from the bottom of that coil to the bottom of the next outward coil, etc.

In order to make the layer-to-layer transition with this type of coil connection, one common construction is as follows. Adjacent to the coil-to-coil connecting strap at the top of each coil, a section of electrically-inactive supporting material is provided which tapers in thickness from the thickness of the top turn to zero and provides a gradual transition of radial position for the conductors which are supported beneath it. This electrically-inactive material occupies a substantial part of the circumferential length of the coil end turn extending in some cases around to the coil corner or beyond. These supporting fillers extend in opposite circumferential directions for adjacent coils, so that the space between the end windings and the rotor spindle is restricted over a large fraction or, in some cases, the entire circumference.

Accordingly, one object of the invention is to provide an improved arrangement for connecting the coils of a dynamoelectric machine rotor winding.

Another object of the invention is to provide an improved dynamoelectric machine rotor winding which gives a maximum unobstructed space between the retaining ring and the rotor spindle.

The subject matter which is regarded as the invention is particularly pointed out and distinctly claimed in the concluding portion of the specification. The invention however, both as to organization and method of practice, together with further objects and advantages thereof, may best be understood by reference to the following description, taken in connection with the accompanying drawing in which:

FIG. 1 is a perspective view, partly in section, showing a portion of the end turns of the three innermost coils of a generator rotor field winding.

FIG. 2 is a diagrammatic end view illustrating one type of prior art end turn arrangement, and FIG. 3 is a similar end view illustrating the end turn arrangement of the invention.

Briefly stated, the invention is carried out by making the coil-to-coil connections at the corners of the end turns by extending alternately the top and bottom conductors axially from the slot to the next outer coil, while alternately short circumferential portions and axial portions of the end winding are depressed at the corner by one conductor thickness.

Referring to FIG. 1 of the drawing, there is seen in perspective view a portion of the end turns of the three innermost coils at the corners thereof. Although the invention is applicable to either gas or liquid-cooled rotors, the rotor shown is liquid-cooled. However, the many liquid connections, pipes, blocking members, etc. normally used have been omitted in order not to obscure the invention.

The rotor body, shown generally at 1, includes a number of circumferentially spaced, longitudinally extending slots 2 with the exception of the rotor pole portion designated by bracket 3. Slots 2 are arranged with dovetail grooves 4 and mating slot wedges 5 in order to retain the slot lying portions of conductors 6 in the slots. The end turns of the winding, comprising axially extending members 7 and circumferentially extending members 8, are held in place by a massive retaining ring 9 in a manner well known in the art. Conductors 6 are insulated from the walls of slot 2 and from the retaining ring 9 by heavy ground insulation 10, 11 respectively. Although not designated in the drawing, it will be understood by those skilled in the art that each of the conductors 6 is also insulated from adjacent conductors 6 by relatively light "turn insulation" adequate to withstand the turn-to-turn electrical potential.

Conductors 6 are cooled by means of liquid circulating through central conduits such as 12, which are supplied through insulated hoses and manifolds, such as 13, 14 respectively, shown connected to the bottom of one of the conductors. It will be understood that a great many more such hoses and manifolds 13, 14 would be required in actual practice.

The winding may be formed from a continuous strip, or as is the case in the embodiment shown, the circumferential members 8 are made in pieces separate from the straight axially extending members 7 and are joined together to make square corners by means of overlapped joints 15, which may be brazed or otherwise suitably joined together to prevent leakage of the liquid. In order to provide reduced fluid resistance, separate transition pieces (not shown) with curved fluid passages therein may be used to form the corners, the circumferential and axial sections of the winding each connecting with a transition piece.

The construction of the winding may be best understood by describing in succession the method of winding innermost coil 16, the next outlying coil 17, and the next succeeding coil 18, it being understood that several more coils (not shown) are disposed outward of coils 16, 17, 18 in the same manner. The innermost coil 16 is wound from bottom to top of the slot, coil 17 is wound from top to bottom, and coil 18 is wound from bottom to top, etc. The innermost coil 16 is generally disposed in a pair of relatively shallow slots 19 on either side of pole portion 3, whereas the remainder of slots 2 are of greater and of equal depth. The main D.-C. excitation lead (not shown) is connected to a bottom circumferentially extending conductor 20, which joins an axially extending conductor entering the companion to slot 19 (not shown). The latter conductor extends to the other end of the rotor, joins a circumferentially extending member on the other end of the rotor and returns as a bottom conductor 21 in slot 19. Conductor 21 is connected to a circumferentially extending conductor 22 which is brought radially upward by the thickness of one conductor by bending at the location indicated by arrow 23. Coil 16 is wound in this fashion until the top conductor 24 from slot 19 terminates the coil. For the coil-to-coil connection, conductor 24 is extended straight out axially to bridge the gap between coils by its end portions 24a, and connected with the top circumferentially extending conductor 25 of the next outer coil 17. It will be observed that a short section of the stack of circumferential members 8 of coil 16 is depressed from a radius $R_1$ to a radius $R_2$ near the corner.

Coil 17 is wound from the top to the bottom of the slots as follows. Circumferentially extending member 25 joins an axially extending member entering a slot (not shown) on the other side of pole portion 3. This axial member extends to the other end of the rotor where it is connected to the top conductor 26 shown emerging from slot 2. Conductor 26 is bent radially inward by one conductor thickness at the location indicated by arrow 27, so that it can be connected to the next underlying conductor 28 below the circumferentially extending conductor 25. Thus conductor 26 emerges at radius $R_1$ and is depressed to radius $R_2$ as indicated. The winding of coil 17 continues in this manner until the bottom axially-extending conductor 29 completes the coil. Conductor 29 is extended axially to bridge the gap between coils 17, 18 with its end portion 29a so as to connect with the bottom circumferentially extending conductor 30 of coil 18.

Conductor 30 is bent radially outward at the location indicated by arrow 31 by an amount equal to the radial thickness of one conductor, in the same manner as was the conductor 22 of coil 16. Coil 18 is wound from bottom to top with the last axially extending conductor 32 being extended as shown to the next outermost coil.

Thus, the winding continues with alternating top-to-top and bottom-to-bottom connections between coils made by axially extending the top and bottom slot conductors respectively so that they join the next coil at the corners. Where the top conductors in the slot are extended, a short section of the circumferential portions 8 of the end turns is depressed near the corner of the coil as at 23. Where the bottom conductors in the slot are extended, a short section of the axially extending portions 7 is depressed as at 27. Thus an added radial layer in excess of the number of layers in the slot is required only at the corner of the coil, and the remainder of the distance beneath the circumferential portions of the end turns is free of blocking. This free space can be gainfully employed for liquid connections or for free space for cooling gas. It will be understood that the coils for the other rotor pole are connected at corners 180° from the connected corners described, so that the rotor is statically and dynamically balanced.

At the locations where the conductors are bent radically inward, insulating members 33, or in some cases copper shims (not shown) may be employed. The size of such supporting members of the present invention are considerably smaller than the blocking members which have been required in previous types of coil-to-coil connections.

In order to illustrate the advantages obtained between the coil-to-coil connection of the invention and one commonly used type of prior art coil-to-coil connection, reference may be had to FIGS. 2 and 3. FIG. 2 shows a prior art construction with coil-to-coil connections made along the pole centerline. FIG. 2 is an axial view into the rotor spindle 34 with rotor body 35 and slots 36 seen beyond. The circumferential portions 37 of a single coil are shown, with a top-to-top connection 38 to an inlying coil and a bottom-to-bottom connection 39 to an outlying coil. A tapered supporting member 40 is used to fill out the equivalent thickness of a conductor as the layer-to-layer transition is made over arc "A." Therefore, over arc "A" there are 9 total layers in the end turns, despite the fact that the coil is only 8 layers deep. Due to the alternating coil-to-coil connections, the end turn space will be obstructed by the adjacent inlying and outlying coils over an equal arc "A" in the other direction from the pole centerline as indicated by the dotted line 37a. This leaves a relatively restricted annular space 41 between the spindle 34 and the bottom coil layers, which extends over an arc 2A, or a substantial portion of the end turns.

FIG. 3 shows a similar rotor with like members designated by the same reference numbers. The coil 42 is connected to inner and outer coils (not shown) with a top-to-top connection 43 and a bottom-to-bottom connection 44. A very small amount of filler material 45 is required near the corner. The depressed portion of the circumferential end turns of the inlying coil is indicated by dotted line 42a. It will be observed that over the major portion of the end turns, there are only 8 layers of conductor thickness. A considerably larger unobstructed annular space 46 remains than in the prior art construction of FIG. 2.

Returning to FIG. 1, it will be observed that the radial distance $R_1$ from the rotor axis to the top circumferentially extending conductors and to the top axially extending conductors is the same with the exception of the very short portions near the corners, where the radial distance is shown as $R_2$. Only at the location of the coil corners is the free space in the end turn region reduced by the radial thickness of an extra conductor. Thus, the maximum amount of free space is left open below the end turns for the passage of cooling gas or, in the case shown, for the many liquid hoses and pipes necessary for a liquid-cooled rotor. Also, the pole centerline is unobstructed between coils for making liquid connections here, whereas with previous constructions it has been obstructed by the coil-to-coil connections.

It will be apparent that the structure for making coil-to-coil connections at the corners by means of axially extending conductors from the slots is not limited to the type of conductors shown, but would also be applicable where there are two or more stacks of conductors in the slots. The number of conductors stacked radially, of course, depends upon the design, but the invention is primarily useful where the conductors have a substantial radial thickness so that the thickness of one extra conductor in the end turn region would seriously reduce the available space.

While there is shown what is considered at present to be the preferred embodiment of the invention, it is of course understood that various other modifications may be made therein, and it is intended to cover in the appended claims all such modifications as fall within the true spirit and scope of the invention.

What I claim as new and desire to secure by Letters Patent of the United States is:

1. A dynamoelectric machine rotor comprising a rotor body defining circumferentially spaced, axially extending slots, a winding disposed in said slots comprising a plurality of coils circumscribed about one another, each coil including radial stacks of axially extending conductors and radial stacks of circumferentially extending conductors connecting said axially extending conductors in series relationship, said coils being connected in series relationship by first and second axially extending conductors alternating from the tops and bottoms respectively of adjacent slots and joined to the circumferentially extending conductors of each next outlying coil, said conductors being arranged and constructed so that all of the circumferentially extending conductors in the stacks underlying said first axially extending conductors and all of the conductors in the stacks overlying and including said second axially extending conductors are depressed radialy inwardly by approximately one conductor thickness immediately adjacent the coil corners.

2. A dynamoelectric machine rotor comprising a rotor body defining circumferentially spaced, axially extending slots, a winding disposed in said slots comprising a plurality of coils circumscribed about one another, each coil including radial stacks of axially extending conductors and radial stacks of circumferentially extending conductors connecting said axially extending conductors in series relationship, said coils being connected in series relationship by first and second axially extending conductors alternating from the tops and bottoms of adjacent slots respectively, and extending to join the respective top and bottom circumferentially extending conductors of each next outlying coil, the axially extending conductors of alternating stacks and the circumferentially extending conductors of the intervening stacks which are connected thereto being depressed radially inward by approximately one conductor thickness adjacent the coil corners.

3. A dynamoelectric machine rotor comprising a rotor body defining circumferentially spaced, axially extending slots, a winding disposed in said slots comprising a plurality of coils circumscribed about one another, each coil including radial stacks of radially extending conductors and radial stacks of circumferentially extending conductors electrically connecting said axially extending conductors in series relationship, said coils being connected in series relationship by first conductors extending axially from the top layer of alternate first slots and by second conductors extending axially from the bottom layer of second slots between said first slots, the circumferentially extending conductors of the coils entering said first slots and the axially extending conductors of the coils entering said second slots all being depressed radially inward toward the rotor axis by substantially one conductor thickness adjacent the coil corners, so that the bottom depressed conductors between two coils may be connected together at the coil corners.

References Cited by the Examiner

UNITED STATES PATENTS 2,779,884   1/57   Kilner _____ 310—64

FOREIGN PATENTS 594,778   10/44   Great Britain.

MILTON O. HIRSHFIELD, *Primary Examiner.*